(12) United States Patent
He et al.

(10) Patent No.: US 9,894,711 B2
(45) Date of Patent: Feb. 13, 2018

(54) SYSTEM AND METHOD FOR IDENTIFYING DATA

(71) Applicant: SPREADTRUM COMMUNICATIONS (SHANGHAI) CO., LTD., Shanghai (CN)

(72) Inventors: Yuancai He, Shanghai (CN); Shaohua Xia, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 238 days.

(21) Appl. No.: 14/842,277

(22) Filed: Sep. 1, 2015

(65) Prior Publication Data

US 2016/0066213 A1    Mar. 3, 2016

(30) Foreign Application Priority Data

Sep. 1, 2014  (CN) .......................... 2014 1 0440507

(51) Int. Cl.
*H04W 80/02*    (2009.01)
*H04L 1/00*    (2006.01)
*H04W 28/06*    (2009.01)

(52) U.S. Cl.
CPC .......... *H04W 80/02* (2013.01); *H04L 1/0083* (2013.01); *H04W 28/06* (2013.01)

(58) Field of Classification Search
CPC .... H04W 80/02; H04W 28/06; H04L 1/0083; H04L 1/0084; H04L 1/18; H04L 1/1803; H04L 1/1864; H04L 1/1896

USPC .......................................... 370/310, 328, 329
See application file for complete search history.

(56) References Cited

U.S. PATENT DOCUMENTS

| | | | | |
|---|---|---|---|---|
| 7,936,735 B2 * | 5/2011 | Obuchi | ................. | H04L 1/1887 370/338 |
| 2005/0226206 A1 * | 10/2005 | An | .......................... | H04L 45/00 370/349 |
| 2010/0054139 A1 * | 3/2010 | Chun | .................... | H04L 1/1678 370/252 |

FOREIGN PATENT DOCUMENTS

CN    103678419 A    3/2014

* cited by examiner

*Primary Examiner* — Obaidul Huq
(74) *Attorney, Agent, or Firm* — Levenfeld Pearlstein, LLC (57) ABSTRACT

The present invention discloses a system and a method for identifying data, which relates to the field of data transmission. The system comprises a transmitting end and a receiving end, the receiving end comprises a data receiving unit, a first field determining unit, a second field determining unit, identification unit, the method comprises: receiving a PDU with the first one and the second one of length indication fields transmitted by the transmitting end; analyzing and determining whether the value of the second one of length indication fields is equal to a first preset value; if the above two judgments are success, then the corresponding PDU data pack would be identified as valid. The positive effects of the above technical schemes are: remedying the defect of the protocol in that the descriptions of the PDU package with the upstream construction and the PDU package with the downstream reconstruction are inconsistent.

14 Claims, 4 Drawing Sheets

FIG. 1

| SN | 1 |
|---|---|
| 0x00 | 1 |
| 0x7D | 0 |
| DATA ||

FIG. 2

| SN | 1 |
|---|---|
| 0x00 | 1 |
| 0x7FFD | 0 |
| DATA ||

FIG. 3

| SN | 1 |
|---|---|
| 0x7FFB | 1 |
| 0x7FFD | 0 |
| DATA ||

SYSTEM AND METHOD FOR IDENTIFYING DATA

BACKGROUND OF THE INVENTION

The present invention relates to the technical field of data transmission, more specifically, to a system and method for identifying data.

In the prior art, when the PDU (Protocol Data Unit) data package is transmitted between two communication ports, it is necessary to conduct upstream construction and downstream reconstruction to PDU data package. And as for the PDU data transmission technique in the prior art, it is likely to appear that the PDU data package formed by upstream construction can not be identified by the downstream reconstruction, which interrupts valid data transmission and triggers the retransmission process, and thereby extending the data transmission period and lowering the data transmission efficiency.

SUMMARY OF THE INVENTION

To solve the technical problems in the prior art, the present invention provides technical solutions regarding a system and method for identifying data, in order to resolve the problem that valid PDU data packages constructed can not be then identified or reassembled due to various protocol rules in the prior art.

The above mentioned technical schemes specifically comprise:

A system for identifying data, comprising:

a transmitting end, a receiving end, a PDU (Protocol Data Unit) related to an unacknowledgement mode data, the transmitting end transmitting a PDU with a first identification and a second identification to the receiving end through a communication network;

the receiving end comprising:

a data receiving unit for receiving the PDU;

a second field determining unit connecting the data receiving unit for determining whether the value of the second identification is equal to a first preset value, and thereby outputting a corresponding first determining result;

a first field determining unit connecting the second field determining unit, the first field determining unit comprising a second preset value configured for determining whether the received value of the first identification is equal to the first preset value when the value of the second identification is equal to the first preset value, based on the first determining result, and thereby outputting a corresponding second determining result; and an identifying unit connecting the first field determining unit, the identifying unit being configured for based on the first determining result and the second determining result, identifying the corresponding PDU as a valid data package when the value of the second identification being equal to value of the first preset value and the value of the first identification being equal to the second preset value.

Preferably, the system as mentioned above, wherein the first identification is the first one of length indication fields in the PDU;

the second identification is the second one of length indication fields in the PDU.

Preferably, the system as mentioned above, wherein the first field determining unit further comprises the first preset value the first field determining unit is configured for determining whether the value of a received first identification in the PDU is equal to the first preset value, and thereby outputting the corresponding second determining result;

the identification unit identifying the PDU as a valid data package when the value of the first identification equals to the first preset value, based on the second determining result.

Preferably, the system as mentioned above, further comprising:

a field length determining unit connected between the data receiving unit and the second field determining unit, the field length determining unit being configured for determining length of a received first identification and second identification in the PDU, and thereby outputting a corresponding third determining result.

Preferably, the system as mentioned above, wherein, the first preset value is 0x7D.

Preferably, the system as mentioned above, wherein, the second preset value is 0x00.

Preferably, the system as mentioned above, wherein, the first preset value is 0x7FFD.

Preferably, the system as mentioned above, wherein, the second preset value is 0x00 or 0x7FFB.

Preferably, the system as mentioned above, wherein data is transferred between RLC (Radio Link Control) entities of the transmitting end and the RLC entities of the receiving end by an unacknowledgement mode.

A method for identifying data, comprising a transmitting end and a receiving end, a PDU (Protocol Data Unit) related to an unacknowledgement mode data, the transmitting end transmitting a PDU with a first identification and a second identification to the receiving end through a communication network, the method further comprising:

S1, receiving the PDU;

S2, analyzing and determining whether the value of a second identification in the PDU is equal to a first preset value;

if the value of the second identification is not equal to the first preset value, exiting;

S3, analyzing and determining whether the value of a first identification in the PDU is equal to a second preset value;

if the value of the first identification is not equal to the second preset value, exiting;

S4, recognizing the corresponding PDU as a valid data package.

Preferably, the system as mentioned above, wherein the first identification is the first one of length indication fields in the PDU;

the second identification is the second one of length indication fields in the PDU.

Preferably, the system as mentioned above, in S2, if the value of the second identification is not equal to the first preset value, performing the steps as follows;

S21, analyzing and determining whether the value of the first identification is equal to the first preset value;

if the value of the first identification is equal to the first preset value, turning to S4;

if the value of the first identification is not equal to the first preset value, exiting.

Preferably, the system as mentioned above, wherein before implementing S2, performing the following determination:

S11, determining the length of the first identification and the second identification;

if the length of the first identification and the second identification is 7 bit, turning to S12;

if the length of the first identification and the second identification is 15 bit, turning to S13;

S12, selecting 0x7D as the first preset value and 0x00 as the second preset value, turning to S2;

S13, selecting 0x7FFD as the first preset value and selecting 0x00 or 0x7FFB as the second preset value, turning to S2.

Preferably, the system as mentioned above, wherein data is transferred between RLC entities of the transmitting end and the RLC entities of the receiving end by an unacknowledgement mode.

The positive effects of the above technical solutions are: it is extended to determine the first two length indication fields rather than only determining the first length indication field, and compensating the defect that the descriptions of the PDU data package upstream constructed differs from the descriptions of the PDU data package downstream constructed. In such way, the receiving end can identify the valid PDU data packages, reduce the data transmission period, and improve the efficiency of data transmission.

DETAILED DESCRIPTION

The present invention will be further illustrated in combination with the drawings and embodiments. Obviously, the described embodiments are only part of the available embodiments for the present invention instead of all the embodiments. It should be appreciated that according to the embodiments in the present invention, the other equivalent embodiments which may be achieved by the skilled in the art without making any inventive work should also fall into the scope of the present invention.

Figure 1:
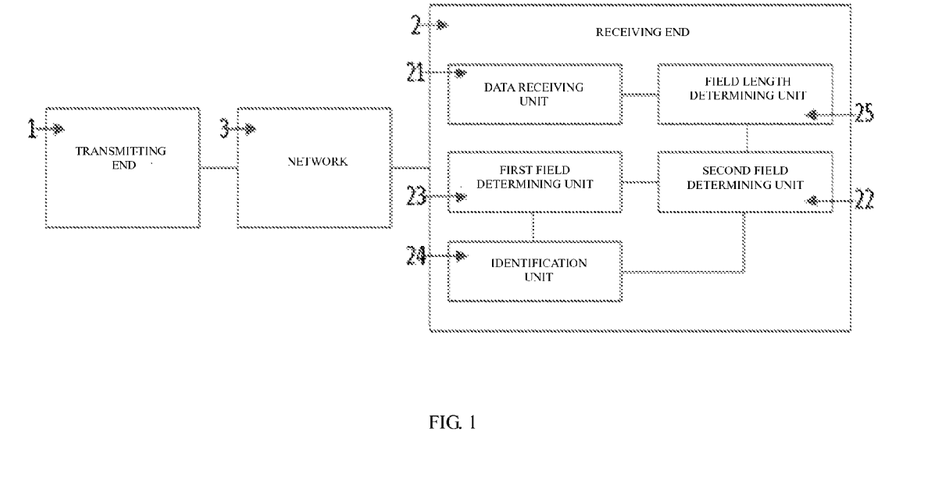
FIG. 1 illustrates a structure diagram of a system for identifying data in one of the preferred embodiments of the present invention.

In one of the preferred embodiments, a system for identifying data is provided, the structure is shown in FIG. 1, comprising a transmitting end 1 and a receiving end 2, the transmitting end 1 transmits data to the receiving end 2 through a communication network 3. Preferably, the data between the RLC (Radio Link Control) entity of the transmitting end 1 and the RLC entity of the receiving end 2 is transmitted via UM (Unacknowledged Mode). Therefore, PDU data packages transmitted via UM are UMD_PDU data packages, i.e., the PDU of Unacknowledged Mode Data, UMD.

In one of the preferred embodiments that the transmitting end 1 sends UMD_PDU data packages to the receiving end 2, the transmitting end 1 constructs the UMD_PDU data packages firstly, and then the constructed UMD_PDU data packages are transmitted to the receiving end 2, and the UMD_PDU data packages are reconstructed and received by the receiving end 2.

In one of the preferred embodiments, in the regulation of the related communication protocol, according to the regulation of 25.322 protocol, there is inconsistent between UMD_PDU data packages upstream constructed and the UMD_PDU data packages downstream reconstructed in this case, the valid UMD_PDU data packages upstream constructed can not be identified by the downstream reconstruction (being invalid by the downstream).

More specifically, to each UMD_PDU data package, when they are transmitted via UM, its package header may have the field of LI (Length Indication). The PDU is related to the UMD, and has a first identification and a second identification. The first identification is the first one of length indication fields in the PDU, the second identification is the second one of length indication fields in the PDU. Preferably, one PDU data package may comprises multiple SDUs (Service Data Units); and the construction of the PDU data package is to divide or combine varies IP packages into a package with certain length for transmission based on the communication protocol and actual requirements. In one of the preferred embodiments of the invention, LI field refers to the data length of the IP package in PDU data package, in another word, LI field is configured for distinguishing various IP package in one PDU data package.

In one of the preferred embodiments, according to the regulation of the relevant communication protocol, during the upstream construction of PDU, the value of the first identification being equal to 0x7D or 0x7FFD is valid, or the value of the second identification being equal to 0x7D or 0x7FFD is valid, i.e., the PDU data packages can be constructed according to the above mentioned protocol regulation.

And with respect to every PDU data package, the downstream reconstruction of PDU is to reconstruct the SDU which has been divided or combined based on the LI filed so as to be analyzed and received by the receiving end 2.

More specifically, in the regulation of the relevant communication protocol, as for the PDU downstream reconstruction, the PDU data package will be deemed as valid only if the value of the first identification of the PDU data package equals to 0x7D or 0x7FFD, and the rest of the PDU data package would be deemed as invalid and being discarded, so as to trigger the retransmission.

Figure 2:
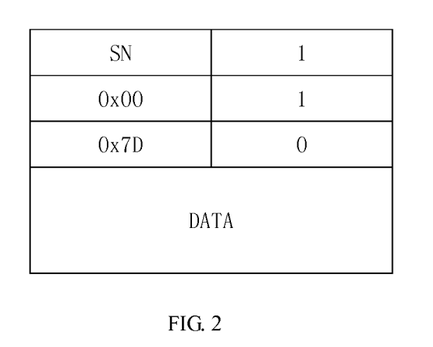
FIGS. 2-4 illustrate a structure diagram of length indication fields included in a PDU data package in an embodiment of the present invention.
Figure 3:
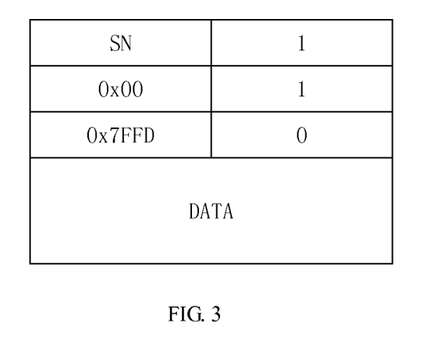
Figure 4:
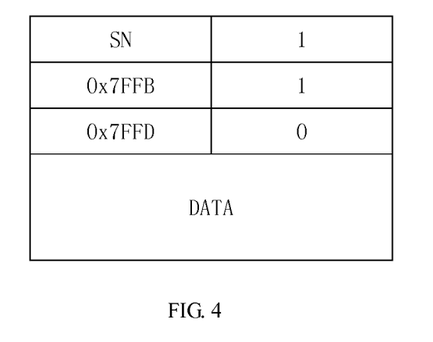

For instance, in one of the preferred embodiments, as shown in FIGS. 2-4, several embodiments of the structures of PDU data package are illustrated:

1) As referred in FIG. 2, as the length of the first identification and the second identification is 7 bit, for the upstream construction of PDU, when the second identification is 0x7D, the valuation of 0X00 to the first identification is completely in conformity with the regulation of the communication protocol;

2) As referred in FIG. 3, as the length of the first identification and the second identification is 15 bit, for the upstream construction of PDU, when the second identification is 0x7FFD, the valuation of 0X00 to the first identification is completely in conformity with the regulation of the communication protocol;

3) As referred in FIG. 4, as the length of the first identification and the second identification is 15 bit, for the upstream construction of PDU, when the second identification is 0x7FFD, the valuation of 0x7FFB to the first identification is completely in conformity with the regulation of the communication protocol.

The PDU data package formed by PDU upstream construction is valid and is in conformity with the regulation of the communication protocol for the above three conditions, however, in the communication protocol, the description of construction is inconsistent with that of reconstruction, thus, it is likely to cause that the first identification is not equal to 0x7D or the PDU data package (for example, the PDU data packages constructed by the above three conditions) of 0x7FFD is identified to be invalid during the course of the corresponding PDU downstream reconstruction. This will generate the error identification and useless retransmission, and the efficiency of the transmission of PDU data package would be affected.

Therefore, a preferred embodiment of the present invention provides an above-mentioned data identification system for solving the above mentioned technical problems.

In one of the preferred embodiments, still shown in FIG. 1, the receiving end 2 comprises:

a data receiving unit 21, preferably, the data receiving unit 21 is used for achieving PDU data package with the first identification and the second identification transmitted by the transmitting end 1;

a second field determining unit 22 connecting the data receiving unit, preferably, the second field determining unit 22 comprises a first preset value. Further, according to the regulation of the communication protocol, the first preset value could be 0x7D or 0x7FFD. In one of the preferred embodiments, the second field determining unit 22 analyzes the PDU data package obtained by the data receiving unit 21 and achieves the second identification, and determine the value of the second identification according to the first preset value to output the corresponding first determining result;

a first field determining unit 23 connecting the second field determining unit 22, in one of the preferred embodiments, the first determining unit 23 comprises a second preset value. Further, in a preferred embodiment of the present invention, to correspond to the first preset value, the second value can be 0x00 or 0x7FFB according to the regulation of the communication protocol.

Further, in one of the preferred embodiments, to correspond to the first preset value which is set as 0x7D, the second preset value can be set as 0x00; and to correspond to the first preset value which is set as 0x7FFD, the second preset value can be set as 0x00 or 0x7FFB.

In one of the preferred embodiments, the first field determining unit 23 can output corresponding second determining results based on the determination.

Specifically, in one of the preferred embodiments, the determining process includes:

The second field determining unit 22 determines whether the value of the second identification of the received PDU data packages is equal to the first preset value; if the value of the second identification is equal to the first preset value, then it should turns to the second determination:

The first field determining unit 23, based on the first determining result, is configured for determining whether the value of the first identification of the PDU is equal to a second preset value when the value of the second identification is equal to the first preset value; if the value of the first identification is equal to the second preset value, it means that the corresponding PDU data package is valid, that is to say, it can be identified by the receiving end and can be treated by performing the PDU reconstruction.

According to the regulation of the communication protocol, when the first identification is 0x7D or 0x7FFD, it is deemed as valid. Thus, the first field determining unit 23 also comprises a corresponding first preset value.

When the second field determining unit 22 determines that the value of the corresponding second identification is not equal to the first preset value, the first field determining unit 23 continues to determine whether the value of the first identification is equal to the first preset value; if the value of the first identification is equal to the first preset value, then the corresponding PDU data package should be deemed as valid.

In one of the preferred embodiment, the above mentioned system for identifying data further comprises:

an identification unit 24 respectively connecting the second field determining unit and the first field determining unit, configured for determining whether the PDU data package is valid or invalid based on the above mentioned first determining result and second determining result.

Specifically, in one of the preferred embodiment, when the second field determining unit determines that the value of the corresponding second identification is equal to the first preset value, and when the first field determining unit determines that the value of the corresponding first identification is equal to the second preset value, the identification unit 24 determines that the corresponding PDU data package is valid; or when the value of the first identification is equal to the first preset value, the identification unit 24 determines that the corresponding PDU data package is valid.

Besides the above mentioned two situations, in other situations, the identification unit 24 determines that the corresponding PDU data package is not valid.

In one of the preferred embodiments of the present invention, the above mentioned system for identifying data further comprises:

a field length determining unit 25 connected between the data receiving unit 21 and the second field determining unit 22, the field length determining unit 25 is configured for determining the length of the first identification and the second identification in the PDU data package and for outputting the corresponding third determining result. Preferably, the first preset value and second preset value should be selected based on the length of the first identification and the second identification to be determined.

Specifically, in one of the preferred embodiments, the determining process to the field length is as follows:

the field length determining unit 25 determines whether the length of the first identification and the second identification of the PDU data package received is 7 bit or 15 bit:

if the length of the first identification and the second identification is 7 bit, then the corresponding third determining result is outputted, and the second field determining unit 22 selects 0X7D as the first preset value based on the third determining result; and accordingly, the first field determining unit 23 selects 0X00 as the second preset value based on the third determining result;

if the length of the first identification and the second identification is 15 bit, then the corresponding third determining result is outputted, and the second field determining unit 22 selects 0x7FFD as the first preset value based on the third determining result; and accordingly, the first field determining unit 23 selects 0x00 or 0c7FFB as the second preset value based on the third determining result.

Therefore, in the preferred embodiment of the present invention:

1) when the length of the first identification and the second identification is 7 bit, the second field determining unit 22 determines whether the corresponding second identification is equal to the first preset value, i.e., 0x7D, and outputs the corresponding first determining result;

when the value of the second identification is equal to 0x7D, the first field determining unit 23 determines whether the corresponding value of the first identification is equal to the second preset value, i.e., 0x00, and outputs the corresponding second determining result;

when the value of the first identification is 0x7D, and the second identification is 0x00, the identification unit 24 identifies the corresponding PDU package as valid; or when the first identification is 0x7D, the identification unit 24 identifies the corresponding PDU package as valid.

2) when the length of the first identification and the second identification is 15 bit, the second field determining unit 22 determines whether the corresponding second identification is equal to the first preset value, i.e., 0x7FFD, and outputs the corresponding first determining result;

when the second identification is 0x7FFD, the first field determining unit 23 determines whether the corresponding first identification is equal to the second preset value, i.e., 0x00 or 0x7FFB, and outputs the corresponding second determining result;

when the first identification is 0x7D, and the second identification is 0x00 or 0x7FFB, the identification unit 24 identifies the corresponding PDU package as valid; or when the first identification is 0x7FFD, the identification unit 24 identifies the corresponding PDU package as valid.

In conclusion, the present invention aims at analyzing the LI field at the receiving end after the upstream PDU is constructed according to the communication protocol: determining whether the second identification is equal to the first preset value (0x7D or 0x7FFD stated in the communication protocol), and determining whether the corresponding first identification is equal to a second preset value (corresponding to the first preset value, the second preset value can be selected as 0x00 or 0x7FFB according to the length of the LI fields) when the second identification is equal to the first preset value;

when the second identification is equal to the first preset value and the first identification is equal to the second preset value, the corresponding PDU data package is identified as valid; or when the first identification is equal to the first preset value, the corresponding PDU data package is identified as valid.

The above mentioned ways of determination can overcome the defect on invalid transmission caused by the inconsistence description of the upstream PDU construction and downstream PDU reconstruction in the origin communication protocol. As mentioned above, if the upstream PDU is constructed according to the communication protocol, the corresponding PDU package may be deemed as invalid during the downstream PDU reconstruction because the first identification is not 0x7D or 0x7FFD. Consequently, the above way of determination can avoid the error data package and some other data retransmission mechanism, thereby decreasing the data transmission delay and improving the data transmission efficiency.

In one of the preferred embodiment, the transmitting end 1 can be included in a mobile terminal, and the receiving end 2 can be included in a base station; or the transmitting end 1 can be included in a station, and the above receiving end 2 can be included in a mobile terminal.

The above explains that the entity of upstream PDU construction (i.e., the transmitting end for the PDU data package) can be mobile terminals or base stations, similarly, the entity of the upstream PDU reconstruction (i.e., the receiving end for the PDU data pack) can also be the mobile terminals or the stations. For example:

In the upstream data transmission link, the mobile terminal constructs and transmits the PDU data package, and the base station receives and reconstructs the PDU data package; in the technical solution of the present invention, the transmitting end 1 is included in the mobile terminal, and the above receiving end 2 is included in the base station.

In the downstream data transmission link, the station constructs and transmits the PDU data package, and the mobile terminal receives and reconstructs the PDU data package; in the technical solution of the present invention, the transmitting end 1 is included in the base station, and the above receiving end 2 is included in the mobile terminal.

In one of the preferred embodiments, the above data identification system can be applied to any communication system including the implementation elements, for instance, can be applied to WCDMA communication system, or TD-SCDMA communication system, or LTE communication system.

Figure 5:
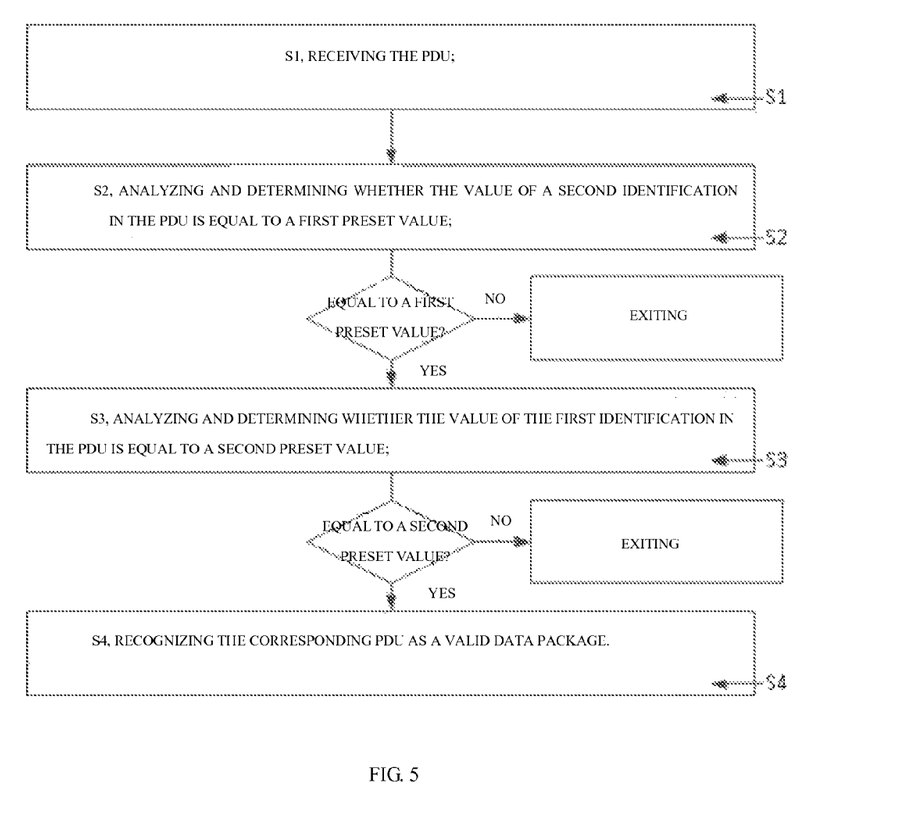
FIGS. 5-7 illustrate a flow chart of a method for identifying data in an embodiment of the present invention.

In one of the preferred embodiments, a data identification method as shown in FIG. 5 is provided, comprising a transmitting end and a receiving end, a PDU (Protocol Data Unit) related to an unacknowledgement mode data, the transmitting end transmitting a PDU with a first identification and a second identification to the receiving end through a communication network; and further comprising the steps of:

S1, receiving the PDU;

In one of the preferred embodiments, performing the transmission to the PDU data pack under UM transmission mode, i.e., the data is transmitted between the RLC entity of the transmitting end and the RLC entity of the receiving end in UM transmission way.

S2, analyzing and determining whether the second identification is equal to a first preset value;

if the second identification is not equal to the first preset value, exiting;

in the preferred embodiment of the present invention, the first preset value can be 0x7D or 0x7FFD. The specific evaluation regulation would be described in the following.

S3, analyzing and determining whether the value of the first identification is equal to a second preset value;

if the value of the first identification is not equal to the second preset value, exiting.

In one of the preferred embodiment, the second preset value could be 0x00 or 0x7FFB. The specific evaluation regulation is as follow:

S4, recognizing the corresponding PDU data package as the valid data package.

In a preferred embodiment, if the value of the second identification is equal to the first preset value, and the value of first identification is equal to the second preset value, the corresponding PDU data package can be deemed as valid, that is, the downstream reconstruction can be preformed.

Figure 6:
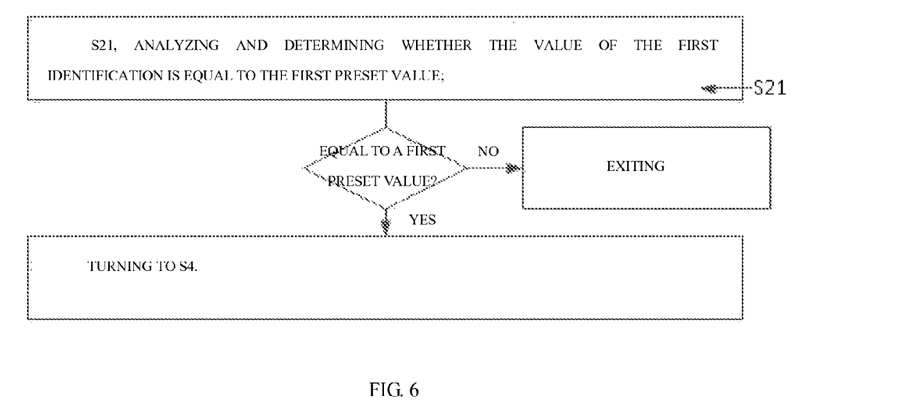

Further, in a preferred embodiment, as referred in FIG. 6, in the above-mentioned S2, if the value of the second identification is not equal to the first preset value, then execute the following judgment:

S21, analyzing and determining whether the value of the first identification is equal to the first preset value;

if the value of the first identification is equal to the first preset value, turning to S4;

if the value of the first identification is not equal to the first preset value, exiting.

In a preferred embodiment, it should be determined whether the value of the first identification is equal to the first preset value prior to exiting, and when the value of the first identification is equal to the first preset value, the corresponding PDU data package should be deemed as valid data package.

Figure 7:
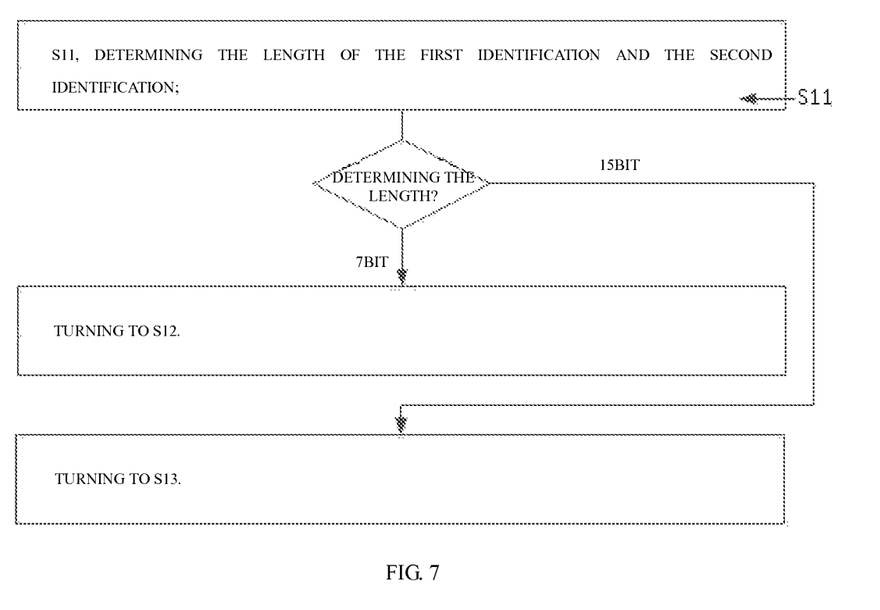

In a preferred embodiment, as for the selection of the first preset value and second preset value, the steps are shown in FIG. 7, comprising:

S11, determining the length of the first identification and second identification;

if the length of the first identification and second identification is 7 bit, turning to S12;

if the length of the first identification and second identification is 15 bit, turning to S13;

S12, selecting 0x7D as the first preset value and selecting 0x00 as the second preset value, turning to S2;

S13, selecting 0x7FFD as the first preset value and selecting 0x00 or 0x7FFB as the second preset value, turning to S2.

Specifically, in a preferred embodiment, firstly, determine the length of the first identification and second identification:

if the length of the first identification and second identification is 7 bit, selecting 0x7D as the first preset value, and selecting 0x00 as the second preset value;

if the length of the first identification and second identification is 15 bit, selecting 07FFD as the first preset value, select 0x00 or 0x7FFB as the second preset value.

Therefore, the determination of the S2 and S3 is altered as:

1) when the first identification and second identification length is 7 bit, determining whether the value of the corresponding second identification is equal to the first preset value, that is, 0x7D, and the first determining result is outputted;

if the value of the second identification is equal to 0x7D, determining whether the corresponding value of the first identification is equal to the second preset value, that is, 0x00, and the value of the second identification is 0x7D and the value of the second identification is 0x00, the corresponding PDU data package would be deemed as valid; or if the first LI field value LI=0x7D, then the corresponding PDU data package should be deemed as valid.

2) when the length of the first identification and second identification is 15 bit, determining whether the value of the corresponding second identification is equal to the first preset value, that is, 0x7FFD, and the first determining result is outputted;

if the value of the second identification is equal to 0x7FFD, determining whether the corresponding value of the first identification is equal to the second preset value, that is, 0x00 or 0x7FFB, and the value of the second identification is 0x7FFD and the value of the first identification is 0x00 or 0x7FFB, the corresponding PDU data pack would be deemed as valid; or if the value of the first identification is 0x7FFD, then the corresponding PDU data package should be deemed as valid.

Preferably, the data between the RLC (Radio Link Control) entity of transmitting end 1 and the RLC entity of receiving end 2 is transmitted via UM mode.

The above-mentioned contents are the preferred embodiments of the invention only, and they are not intended to limit the scope of the invention. Therefore, the various modifications and equivalent arrangements without departing away from the technical solution of the invention are included within the spirit and the scope of the technical solution of the invention.

The invention claimed is:

1. A system for identifying data, comprising:
a transmitting end, a receiving end, a PDU (Protocol Data Unit) related to an unacknowledgement mode data, the transmitting end transmitting a PDU with a first identification and a second identification to the receiving end through a communication network;
the receiving end comprising:
a data receiving unit for receiving the PDU;
a second field determining unit connecting the data receiving unit for determining whether the value of the second identification is equal to a first preset value, and thereby outputting a corresponding first determining result;
a first field determining unit connecting the second field determining unit, the first field determining unit comprising a second preset value configured for determining whether the received value of the first identification is equal to the first preset value when the value of the second identification is equal to the first preset value, based on the first determining result, and thereby outputting a corresponding second determining result; and
an identifying unit connecting the first field determining unit, the identifying unit being configured for based on the first determining result and the second determining result, identifying the corresponding PDU as a valid data package when value of the second identification equal to value of the first preset value and the value of the first identification being equal to the second preset value,
wherein in an upstream data transmission link, the transmitting end in a mobile terminal transmits the PDU, and the receiving end in a base station receives and reconstructs the PDU, and
in a downstream data transmission link, the transmitting end in a base station transmits the PDU, and the receiving end in a mobile terminal receives and reconstructs the PDU.

2. The system as disclosed in claim 1, wherein the first identification is the first one of length indication fields in the PDU;
the second identification is the second one of length indication fields in the PDU.

3. The system as disclosed in claim 1, wherein the first field determining unit further comprises the first preset value the first field determining unit is configured for determining whether the value of a received first identification in the PDU is equal to the first preset value, and thereby outputting the corresponding second determining result;
the identification unit identifying the PDU as a valid data package when the value of the first identification equals to the first preset value, based on the second determining result.

4. The system as disclosed in claim 1, further comprising:
a field length determining unit connected between the data receiving unit and the second field determining unit, the field length determining unit being configured for determining length of a received first identification and second identification in the PDU, and thereby outputting a corresponding third determining result.

5. The system as disclosed in claim 1, wherein, the first preset value is 0x7D.

6. The system as disclosed in claim 5, wherein, the second preset value is 0x00.

7. The system as disclosed in claim 1, wherein,
The first preset value is 0x7FFD.

8. The system as disclosed in claim 7, wherein, the second preset value is 0x00 or 0x7FFB.

9. The system as disclosed in claim 1, wherein, data is transferred between RLC (Radio Link Control) entities of the transmitting end and the RLC entities of the receiving end by an unacknowledgement mode.

10. A method for identifying data, comprising a transmitting end and a receiving end, a PDU (Protocol Data Unit) related to an unacknowledgement mode data, the transmitting end transmitting a PDU with a first identification and a second identification to the receiving end through a communication network, the method further comprising:

S1, receiving the PDU;

S2, analyzing and determining whether the value of a second identification in the PDU is equal to a first preset value;

if the value of the second identification is not equal to the first preset value, exiting;

S3, analyzing and determining whether the value of a first identification in the PDU is equal to a second preset value;

if the value of the first identification is not equal to the second preset value, exiting;

S4, recognizing the corresponding PDU as a valid data package, wherein in an upstream data transmission link, the transmitting end in a mobile terminal transmits the PDU, and the receiving end in a base station receives and reconstructs the PDU, and in a downstream data transmission link, the transmitting end in a base station transmits the PDU, and the receiving end in a mobile terminal receives and reconstructs the PDU.

11. The method as disclosed in claim 10, wherein the first identification is the first one of length indication fields in the PDU;

the second identification is the second one of length indication fields in the PDU.

12. The method as disclosed in claim 10, wherein, in S2, if the value of the second identification is not equal to the first preset value, performing the steps as follows;

S21, analyzing and determining whether the value of the first identification is equal to the first preset value;

if the value of the first identification is equal to the first preset value, turning to S4;

if the value of the first identification is not equal to the first preset value, exiting.

13. The method as disclosed in claim 10, wherein before implementing S2, performing the following determination:

S11, determining the length of the first identification and the second identification;

if the length of the first identification and the second identification is 7 bit, turning to S12;

if the length of the first identification and the second identification is 15 bit, turning to S13;

S12, selecting 0x7D as the first preset value and 0x00 as the second preset value, turning to S2;

S13, selecting 0x7FFD as the first preset value and selecting 0x00 or 0x7FFB as the second preset value, turning to S2.

14. The method as disclosed in claim 10, wherein data is transferred between RLC entities of the transmitting end and the RLC entities of the receiving end by an unacknowledgement mode.

* * * * *

UNITED STATES PATENT AND TRADEMARK OFFICE
CERTIFICATE OF CORRECTION

PATENT NO. : 9,894,711 B2  
APPLICATION NO. : 14/842277  
DATED : February 13, 2018  
INVENTOR(S) : Yuancai He et al.

Page 1 of 1

It is certified that error appears in the above-identified patent and that said Letters Patent is hereby corrected as shown below:

In the Claims

Column 10, Claim 7, Line 55, delete "The" and insert -- the --, therefor.

Signed and Sealed this  
Nineteenth Day of June, 2018

Andrei Iancu  
*Director of the United States Patent and Trademark Office*